United States Patent [19]
Vogelman

[11] 3,921,624
[45] Nov. 25, 1975

[54] APPARATUS FOR RECORDING HEART RATE RHYTHM

[75] Inventor: Joseph H. Vogelman, Roslyn, N.Y.

[73] Assignee: Orentreich Medical Group, New York, N.Y.

[22] Filed: Aug. 14, 1974

[21] Appl. No.: 497,399

[52] U.S. Cl. .......................................... 128/2.06 F
[51] Int. Cl.² .............................................. A61B 5/04
[58] Field of Search...... 128/2.06 A, 2.06 B, 2.06 F, 128/2.06 G, 2.06 R, 2.06 V, 2.05 T, 2.1 A

[56]  References Cited
UNITED STATES PATENTS

| | | | |
|---|---|---|---|
| 3,229,687 | 1/1966 | Holter et al. .................... | 128/2.06 A |
| 3,267,934 | 8/1966 | Thornton ....................... | 128/2.06 A |
| 3,463,143 | 8/1969 | Karsh............................. | 128/2.06 A |
| 3,586,835 | 6/1971 | Foeh, Jr. ........................ | 128/2.06 F |
| 3,599,628 | 8/1971 | Abbenante et al. ............. | 128/2.06 F |
| 3,661,147 | 5/1972 | Mason et al. ................... | 128/2.05 T |

*Primary Examiner*—William E. Kamm
*Attorney, Agent, or Firm*—Hopgood, Calimafde, Kalil, Blaustein & Lieberman

[57]  ABSTRACT

A heart monitoring unit provides a visual record of the instantaneous rate of each pair of successive heart beats, such that any rhythm irregularities, such as extra beats, missed beats, premature beats, sinus arrhythmia, and the like, can thereby be readily observed. The heart beat signals are converted to a binary signal representative of the rate of each pair of successive R-waves. The unit includes a counter and a source of a plurality of clock signals of integral binary multiples. A logic circuit controlled by the binary count in selected stages of the counter selectively applies clock signals at progressively lower rates to the counter until the detection of the next R-wave. That signal is converted to a corresponding analog signal which drives a recorder to produce the visual record.

5 Claims, 4 Drawing Figures

APPARATUS FOR RECORDING HEART RATE RHYTHM

This invention relates generally to heart monitoring apparatus, and more particularly to an apparatus for monitoring the heart beat of a patient to provide a visual indication of a possible arrhythmia.

Cardiac arrhythmia or heart pulse rate irregularities area of many different types, ranging from normal arrhythmias to those found only in the presence of heart disease. These irregularities may persist for only a brief period of time, whereas others may persist for only a single heart beat.

Such abnormal heart patterns occur in various forms in different patients, and also vary with the stress, both emotional and physical, to which the patient is subjected. Accurate information concerning the existence, as well as the frequency and extent, of these irregularities in the normal heart pattern is necessary for the proper diagnosis and treatment of heart disease. Failure to detect a condition of arrhythmia and the resulting failure to take the proper remedial steps, such as the insertion of a heart pacemaker, may have serious and unfortunate consequences.

Numerous devices to monitor a patient's heart condition have been developed and are in widespread use by physicians, the most common of which is the electrocardiogram (EKG). Although devices have been developed to specifically detect arrhythmias, the technique that is presently most commonly employed to detect arrhythmia is the evaluation of electrocardiograms taken of the patient's heart pattern. The ability to perform such an evaluation, however, requires the accumulated knowledge and experience of a specialist as well as complex and sophisticated equipment. Moreover, such evaluations are often time consuming and require the measurement of a large number of pulse intervals which are compared to the preceeding measured pulse intervals to determine any variation in heart rhythm. In addition to being tedious and time-consuming, the use of the known procedures may fail to detect the occurrence of a serious arrhythmia in the patient's heart rhythm.

One device specifically designed to detect arrhythmia is described in U.S. Pat. No. 3,633,569 wherein the arrhythmia occurrence is determined by measuring the time intervals between the R-peaks of a cardiac-generated wave. The relative durations of successive time intervals are compared and each succeeding time interval varying in duration by more than a standard amount is counted. The number of counts of such arrhythmia occurrences are indicated on a series of readout lights. This device, although useful for indicating that an arrhythmia condition exists, does not provide the type of record that permits the ready determination of the type of irregularity involved and is, moreover, relatively complex in design and manner of operation. Other arrhythmia detectors that have been proposed are described in U.S. Pat. Nos. 3,658,055 and 3,677,260.

U.S. Pat. No. 3,717,140, describes a cardiac device that decreases the time required by a nurse to count a patient's pulse rate. In the system disclosed in this patent, a transducer responsive to the occurrence of a heart beat generates an electrical pulse indicative of each heartbeat. These pulses are applied, together with a train of clock pulses, to a counter which counts the number of clock pulses occurring between two heart beats. This system, however, is not applicable in reliably and quickly detecting the occurrence of arrhythmia.

The known devices that have been heretofore proposed to detect arrhythmia have been characterized by their complexity and by the difficulty in interpreting the data developed, which usually requires the services of a physician who is experienced in interpreting electrocardiagrams. Moreover, the known devices are not able to readily distinguish between the various types and causes of arrhythmia. As a result of these and perhaps other shortcomings, no system for providing a reliable indication of arrhythmia in a form that can be readily interpreted by relatively unskilled personnel is available, even though the need for such a device has long been apparent.

It is an object of the invention to provide a cardiac monitoring unit that permits the ready detection of an abnormal rhythmic pattern in a patient's heart action.

It is a further object of the invention to provide a cardiac monitoring device that provides a visual pattern that permits the detection of arrhythmia even by relatively unskilled personnel.

It is another object of the invention to provide a cardiac monitoring unit that provides a readily comprehensible indication of the occurrence and type of arrhythmia.

It is yet a further object of the invention to provide a cardiac monitoring unit that it particularly useful for detecting abnormal fluctuations in heart rhythm, which is less costly, less complex, and more useful and reliable than any such unit that has heretofore been available.

In accordance with this invention, the above described problems of the prior art are solved by providing a unit for determining and displaying in a visual form the cardiac pattern of a patient that can be readily and accurately evaluated by relatively unskilled medical personnel, such as nurses and technicians, to determine the existence and nature of any abnormal heart rhythm or arrhythmia.

In the system of the invention, a binary signal is developed that is representative of the rate of successive R-waves in the patient's cardiac pattern. That binary signal is processed to develop a corresponding analog signal that is applied to a graphic recorder which in turn, produces the desired visual record from which any arrhythmia in the pattern may be readily observed. These irregularities in heart rhythm are clearly correlated to specific variations in the graphic record which are readily readable by both the specialist and non-specialist alike, thereby reducing the skill and time required in diagnosing many heart-rhythm related diseases.

This invention will be further described in connection with the accompanying drawings in which.

Figure 1:
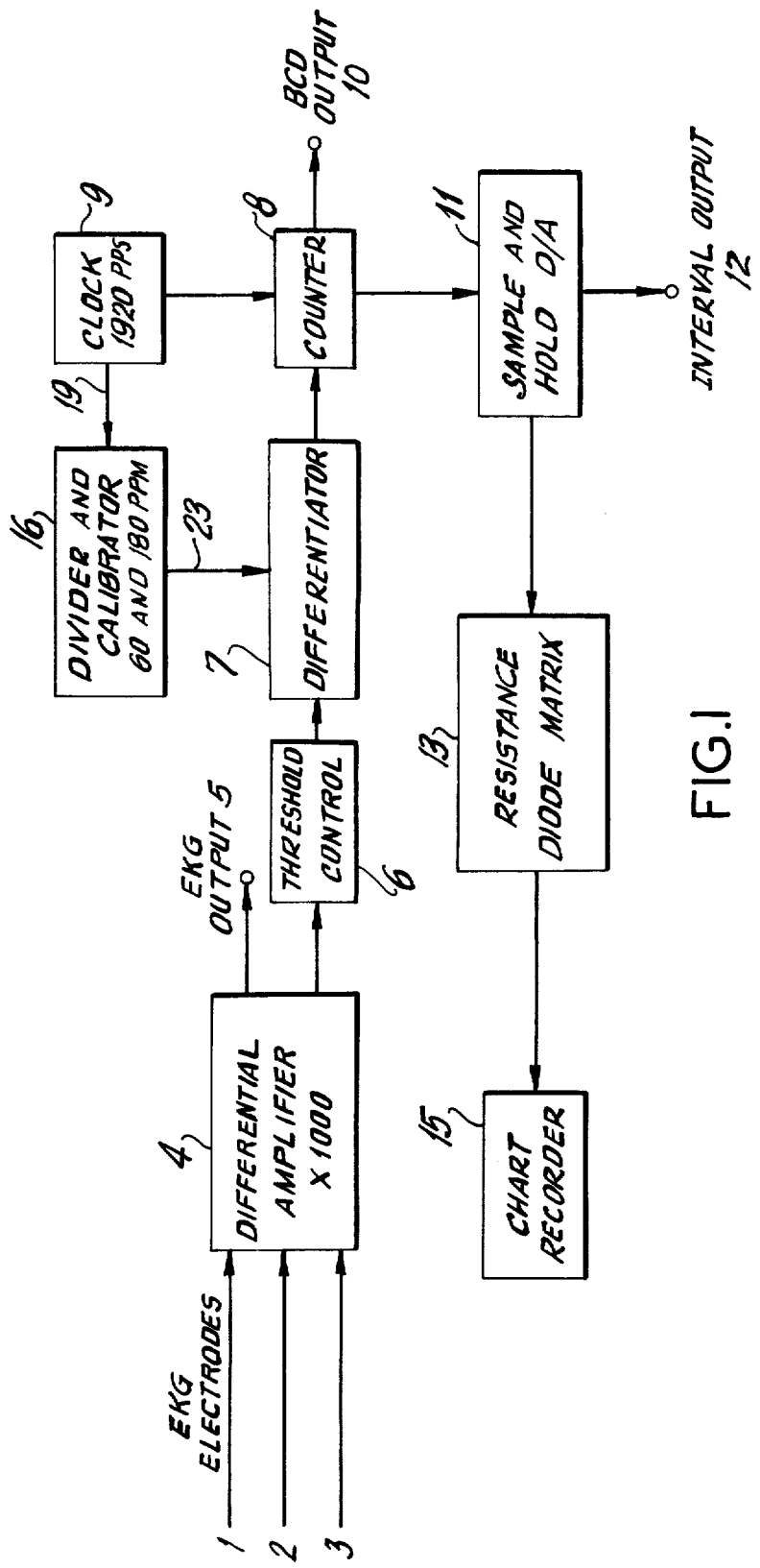
FIG. 1 is a schematic diagram of a cardiac monitoring unit according to one embodiment of this invention.

In the embodiment of the invention illustrated in FIG. 1 three electrodes 1, 2 and 3 are connected to a patient for generating an electrical signal representative of the patient's heart pulses. Electrodes 1 and 2 can be connected to any known positions for such monitoring, such as the left or right arm or the carotid artery of the neck, according to the physician's requirements. The third electrode 3 is generally connected to the leg, thereby acting as a ground or reference point. The other ends of the electrodes are connected to the input of a differential amplifier 4 which amplifies the electrocardiograph signal, which is the voltage difference between leads 1 and 2, by any suitable gain such as 1,000. One output of amplifier 4 is available, if desired, for producing at EKG output 5 a standard electrocardiograph such as that shown in FIG. 3.

Figure 3:
FIG. 3 shows a typical electrocardiogram recorded heart beat waveform, which comprises several pulse-peaks, i.e., P, Q, R, S and T, for illustrating the manner of operation of the unit of the invention.

The output signal of amplifier 4 is also connected to a voltage threshold circuit 6, which is preferably in the form of a Schmitt trigger circuit. The threshold level of circuit 6 is set such that only the voltage of the R-wave exceeds the threshold level, thereby separating the voltage peaks of the R-wave from the other, lower magnitude heart beat pulses, i.e., the P, Q, S and T portions (FIG. 3). If desired, further enhancement and increased separation of the R-wave can be achieved by differentiating the heart beat signal prior to the application of the heart beat signal to the threshold circuit 6, since the R-wave has the sharpest rise time and greatest amplitude of any component of the heart beat signal. The signal produced in threshold circuit 6, which corresponds to the occurrence of an R-wave in the heart pattern, is a pulse having a known amplitude and width. That pulse is applied to a differentiator circuit 7 at which the pulse is differentiated in a known manner to produce a leading-edge trigger and a following trailing-edge trigger.

The differentiated R-wave signal is applied to a counter 8. The leading edge of the differentiated pulse resets the counter clock pulses received from a clock unit 9, here shown for purposes of example as having a clock rate of 1,920 pulses per second. Counter 8 counts the incoming clock pulses until it is reset by the next occurring leading edge of a differentiated R-wave pulse, such that the count established in the counter is a binary coded decimal count of the number of clock pulses received during this time interval; that is, counter 8 counts the number of clock pulses occurring between succeeding R-waves and provides a binary coded decimal count of this number at its outputs.

The binary output of counter 8 is present at a binary coded decimal (BCD) output 10 and is applied in parallel to a sample and hold unit 11 which produces an analog voltage having an amplitude that corresponds to the binary coded decimal information developed in counter 8. The analog voltage level is retained in unit 11 until a new binary count derived from the count either increases or decreases the magnitude of the held analog voltage. That is, if the binary count remains the same, the held voltage in unit 11 remains constant. The generated and held analog voltage, which is thus proportional to the interval between succeeding R-waves, is available at an interval output 12.

The generated analog voltage of unit 11 is applied to a hyperbolic resistance diode matrix 13, which in a known manner, shapes the analog voltage output of unit 11 to an analog voltage having an inverse relationship to the R-wave interval; that is, a relationship of one divided by that interval. The analog voltage developed by matrix 13 is thus directly related to the rate of R-waves in units of pulses per minute. This analog voltage is applied to a chart recorder 15 which, upon receiving this analog voltage, plots or records a visual graphical record, such as that shown in FIG. 2, in which the vertical dimension or ordinate indicates the heart rate from heart beat to heart beat. Irregularities in heart rhythm can be correlated in a manner described in greater detail below to specific variations of this graphic record.

A calibrator 16 is provided to calibrate the chart recorder 15 so that the visual record produced in the manner just described can be correlated to a numerical value of heart beats per minute. To this end, clock pulses of, for example, 1920 pulses per second are supplied by clock 9 to the calibrator. A divider within the calibrator divides down the input clock pulses to a rate of 60 to 180 pulses per second. The selected calibrating pulse rate is coupled through one contact of a calibrate/record switch 17 to the differentiator circuit where these pulses are treated as simulated heartbeat R-wave pulses, and the electrocardiogram signals are disconnected from the remainder of the system. The calibration pulse is differentiated to trigger the start and stopping of the counter 9, as described above, to, in turn, produce a visual record on the chart at a level corresponding to the known rate of the calibration pulses, thereby to calibrate the chart. The calibration procedure is preferably carried out prior to recording the patient's heart rate pattern, and after first making an estimate of the patient's rate, such as by taking his pulse. This estimated rate is used to select the frequency of the calibration pulses so that optimum use can be made of the vertical scale of the recording.

Figure 2:
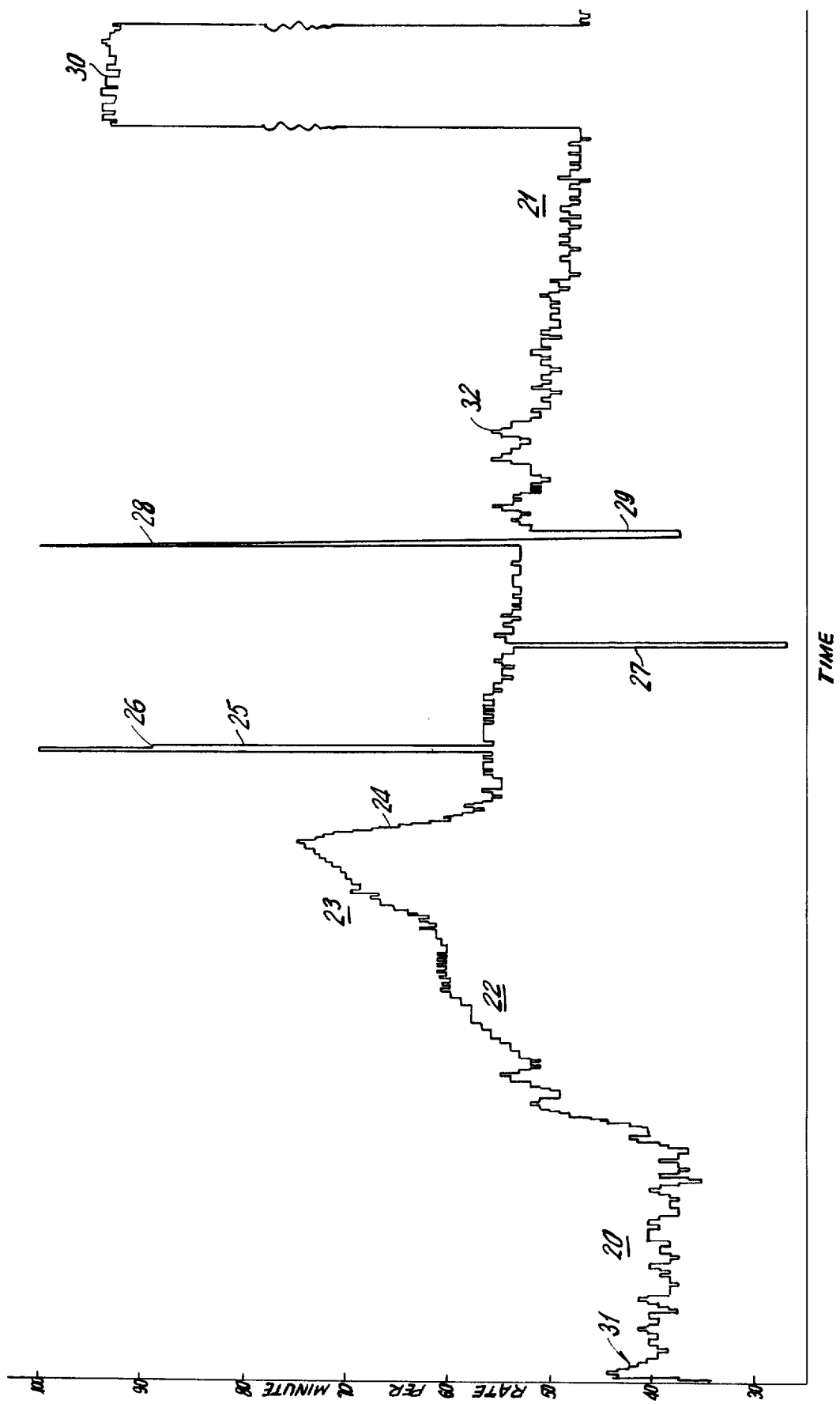
FIG. 2 illustrates a visual record of the type produced by the unit of the invention indicating specific rhythm irregularities of the heart rate.

FIG. 2 is a typical chart or graphic record produced by the unit of the invention that illustrates the most common types of heart rate rhythm irregularities (arrhythmias), and how each can be readily correlated to a specific pattern in the graphic record. The abscissa represents units of time and the ordinate is calibrated to represent the heart rate in beats per minute. For a normal patient at rest, the graphic record is in the form of an approximate straight line which has slight perturbations indicating normal variations in the patient's heart rate. Such periods are indicated at 20 and 21. As the patient then begins to exercise, there is a steady increase in the heart rate as shown by the rising periods 22 and 23. The rate of increase of the heart rate indicated visually by the slope of the periods 22 and 23 provides a meaningful indication of the patient's physical condition. For example, an athlete in good physical condition would have a lower slope (rate of inclination) than would a person who is not accustomed to physical exercise. The patient's heart recovery rate following an exercise period is represented by the rate of decrease of the heart beat upon resuming rest, as indicated by the downwardly sloping line 24.

The occurrence of an extra systole or beat, that is, a beat that occurs between two normal beats, is often overlooked by conventional detection equipment. Such an abnormality in the heart beat is readily and unambiguously detected and indicated on the visual record produced by the system of the invention as a spike or peak 25 which represents an instantaneous doubling of the recorded heart beat produced by the additional pulse. The peak 25 has a step portion indicated at 26 which indicates the time period between the normal pulse and the subsequent extra pulse, so that a more complete analysis of the causes and circumstances leading to the extra beat can be made. Similarly, a missed heart beat can also be unambiguously detected by the system as indicated by the downward peak 27 which represents an instantaneous halving of the heart beat that lasts two units of time; that is, the width of peak 27 extends for a period of two normal heart beats.

A premature beat or premature ventricular contraction that occurs occasionally can be an extremely difficult and time-consuming irregularity to detect with prior art heart monitoring devices. The detection of such an irregularity is, however, significantly simpler in the system of the invention. Such an abnormal occurrence produces first an instantaneous increase in the heart rate, as indicated by the upward peak 28, followed, as a result of the resultant missing normal pulse, by an instantaneous decrease in heart rate, as indicated by the downward going spike 29, after which the pattern returns to a normal pattern.

For a flutter condition (a heart beat of approximately 180 beats per minute or over) or a more serious fibrillation condition, (a heart rate of approximately 240 beats per second or more) the graphical record produced would include a line, such as indicated at 30, which is displaced markedly upwardly from the normal record and remains so displaced during the flutter or fibrillation episode. For certain calibration levels, a flutter of fibrillation episode may cause the record to go off the chart. Such an indication reveals a highly serious abnormality which usually requires immediate attention.

As well as those relatively serious abnormalities in heart rhythm that have been discussed, the system of the invention is also useful to detect and indicate the presence of less serious abnormalities such as sinus arrythmias, which occur as the patient breathes in and out. Such as irregularity is indicated by a regular, relatively small increase and decrease in the normal heart beat rate and is shown, for example, in FIG. 2, as patterns 31 and 32.

FIG. 3 shows a typical electrocardiograph-generated heartbeat waveform, which is available at output 5 of amplifier 4. As can be seen from FIG. 3, several waveform components are generated, i.e., P, Q, S and T, in each heartbeat. As described previously, this heartbeat waveform is applied to the threshold control unit, wherein the R-wave component is separated from the other components, i.e., from the P, Q, S and T components of the electrocardiograph-generated waveform since the R-wave component has the largest magnitude of the generated heart-waveform components. Each heartbeat is thus detected successively to provide a reference point for the measured interval therebetween.

Figure 4:
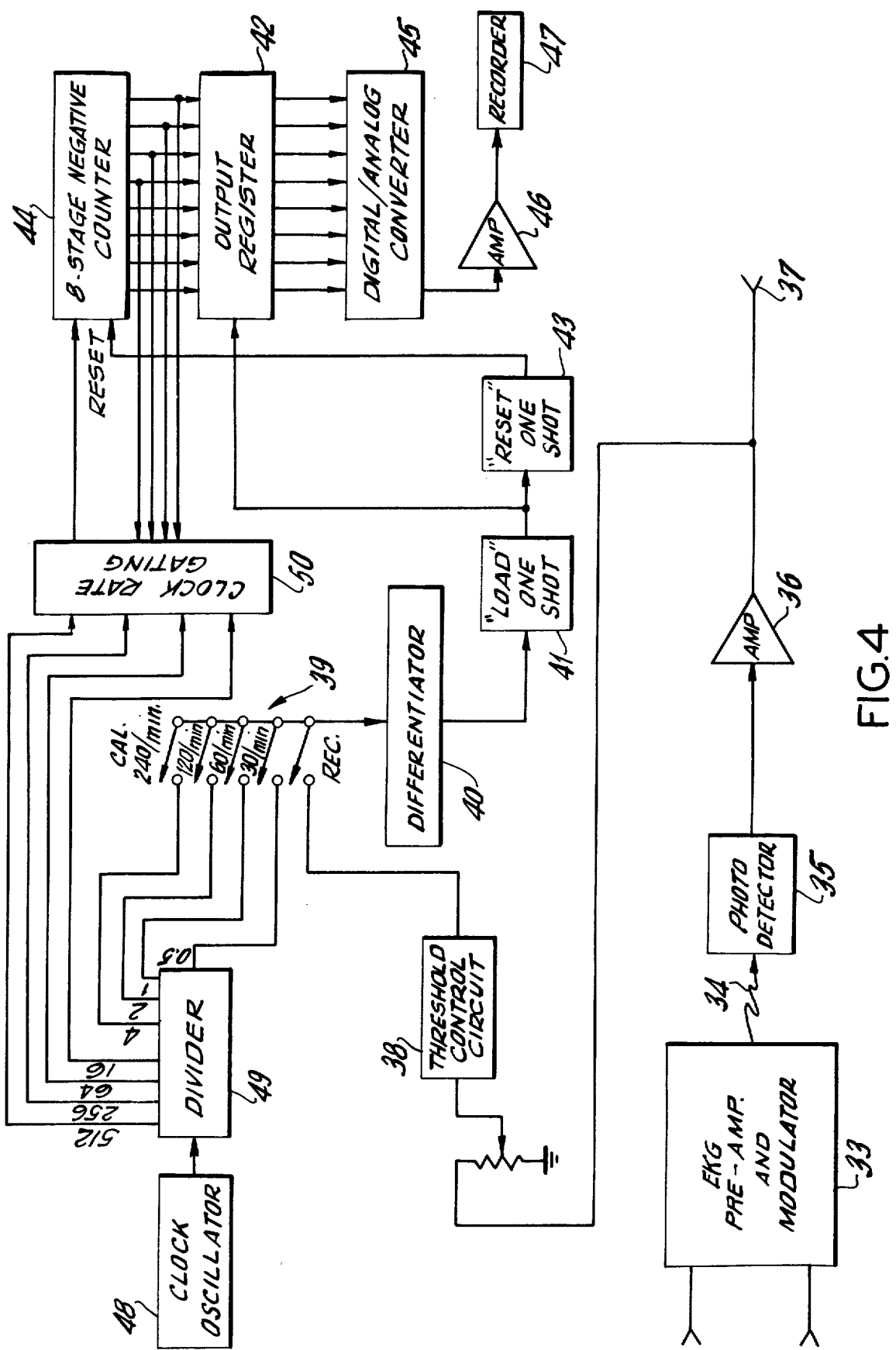
FIG. 4 is a schematic diagram of a cardiac monitoring unit according to an alternate embodiment of the invention.

FIG. 4 illustrates a heart monitoring system according to a second embodiment of the invention. In this embodiment, the electrical signal derived from the electrocardiograph is used to modulate a light beam. This modulation is performed in a known manner in an ECG pre-amp and modulator 33. The thus modulated light beam 34 is detected by a photodetector 35 where the modulated light beam is reconverted to an ECG electrical signal. This procedure is employed to prevent electrical conduction (and possible shock) between the patient and the monitoring system.

The output of detector 35 is applied to an amplifier 36, which produces an amplified ECG signal, which can be read out, if desired, at an output 37. The amplified ECG signal is also applied to a variable threshold control circuit 38, which, as in the first described environment, may be a Schmitt circuit having a variable threshold voltage level. The output of threshold circuit 38, which is in the form of a train of pulses which represent the R-waves of the ECG signal, is applied through the record contact of a multi-contact calibrated record switch 39 to the input of a differentiator circuit 40. Circuit 40 develops from the pulses produced by circuit 38 a series of triggers which correspond to the leading and lagging edges of those pulses.

The differentiated pulses are applied to a "load" one-shot 41, the output of which is applied to an 8-stage output register 42. The output of one-shot 41 is also applied to a "reset" one-shot 43 the output of which is, in turn, applied to the reset input of an 8-stage negative or down counter 44.

The contents of the stages of register 42 are applied in parallel to a digital-to-analog converter 45, which converts the 8-bit binary signal derived from register 42 to a corresponding analog voltage, which, as described later, is representative of the rate of R-waves, or the number of R-waves produced by the patient's heart in a predetermined time interval. That analog voltage is amplified in an amplifier 46, the output of which is applied to a chart recorder 47, which prepares a visual record, such as that shown in FIG. 2.

The counting and calibration pulses are derived, in the system of FIG. 4, from a clock oscillator 48. In the example shown, oscillator 48 produces clock pulses at a frequency of 512 hz, which are applied to a divider 49, which in turn produces pulses at rates of 256, 64, 16, 4, 2, 1 and 0.5 pulses per second. The first three series of pulses along with the 512 pulses are applied to the inputs of a clock rate gating circuit 47, along with signal lines obtained from the foremost significant bit output lines of counter 44. All of the lines of counter 44 are connected in parallel to the stages of the output register.

The lower rate calibrating pulses produced by the divider are applied respectively to the four calibrating contacts of switch 39 and correspond in decreasing order to a heart rate of 240, 120, 60 and 30 beats per minute.

Prior to the operation of the system of FIG. 4 to record a patient's heart beat pattern, the system is calibrated by setting switch 36 to two or more of the four calibration settings corresponding to a rough estimation of the patient's heart rate. The scale of the chart recorder is set to provide an optimum setting for those calibrations and to establish a reference for the scale of the recording.

Once calibration is completed, switch 39 is placed in the record position so that the pulses derived from the R-waves, separated from the other portions of the heart pattern, are applied to differentiator circuit 40 which, as in the previously described embodiment, produces a positive going leading edge and a negative going trailing edge trigger. The leading and trailing edge triggers are applied to one-shot 41, which in response to the leading edge, produces a clearing pulse for register to a digital-to-analog converter 45. The lagging edge trigger causes reset one-shot 43 to produce a pulse that is applied to counter 44 to reset the count there to a maximum value, e.g., all 1's.

The negative or down counter 44 initially received counting pulses from gating circuit 50 at the highest rate (512 pulses/second) and reduces its count by one each time a counting pulse is received. When, after a quarter-second, the count in counter 44 is decreased from its original or reset value (here, 256), to one-half that count (128), the logic circuits (not shown) in the gating circuit 50 switch the rate of counting pulses applied to the counter to the next lowest rate, or 256 pulses/second. For the next quarter second, assuming that counter 44 is not reset by the occurrence of a subsequent heart beat pulse, the count in counter 44 is again decreased upon each receipt of a counting pulse to a value of 64, at which time the logic in gating circuit 50 again switches the rate of counting pulses to the next lowest, or 64 pulses per second. This counting rate is maintained for the next half second until the count in counter 44 is again halved (to 32) at which time the counting pulse rate is again reduced, this time to 16 pulses per second. As a result of this sequence of different rates of the counting pulses applied to the negative counter, the count stored in the counter at any time following a reset of the counter to a maximum value is an approximate inverse of the time from the occurrence of the reset pulse.

Since counter 44 is reset to a maximum count value by the trailing edge of an R-wave pulse, and the register 42 is cleared and its count supplied to the analog-to-digital converter upon the presence of the leading edge of the subsequent R-wave pulse, the binary count stored in register 42 at the time its contents are transferred to the converter represents the inverse of the period, or interval, between two successive R-wave pulses, and, accordingly, directly represents in binary form, the rate of the R-wave pulses. That binary count is converted in converter 45 to a corresponding analog voltage which drives the recorder to produce the desired visual record of the patient's heart pattern, from which any irregularity in heart rhythm can readily and reliably be perceived, even by relatively unskilled personnel as described previously.

Whereas the present invention has been described with respect to several specific embodiments thereof, it will be understood that various changes and modifications will be suggested to one skilled in the art without necessarily departing from the spirit and scope of the invention.

What is claimed is:

1. A cardiac monitoring unit comprising means for detecting the R-waves of the cardiac wave pattern of a patient, means operatively coupled to said detecting means for developing a binary signal having a binary value that is substantially proportional to the instantaneous rate of each pair of successive ones of said detected R-waves, said binary signal developing means comprising a source of a plurality of clock signals including a basic clock signal and integral binary fractions of said basic clock signal, multiple-stage counting means, means for setting a predetermined binary count in said counting means upon the detection of an R-wave, and logic means operatively interposed between said clock signals source and said counting means and receiving said plurality of clock signals and binary signals from selected stages of said counting means, said logic means being effective to selectively apply said clock signals at sequentially lower rates to said counting means in response to the binary signals in said selected stages of said counting means during the period between succeeding R-waves, thereby to modify the signal count in said counting means, and means operatively coupled to said binary signal developing means for producing a visual record corresponding to the binary count in said counting means upon the detection of the succeeding R-wave, said record thereby indicating the respective rates of each succeeding pair of R-waves, whereby the occurrence of an abnormal deviation from a regular heart rhythm can be readily perceived on said record.

2. The monitoring unit of claim 1, further comprising a source of calibrating pulses, and means for selectively inserting said calibrating pulses into said counting means at a preselected one of a plurality of rates.

3. The unit of claim 1 further comprising means coupled to said counting means for storing the binary signal produced in said counting means, and means for transferring the stored count from said storing means to said record producing means upon the detection of the succeeding R-wave.

4. The unit of claim 3, in which said resetting means and said transferring means includes means for differentiating the detected R-wave signal to produce a leading and a trailing edge signal, and means for applying one of said leading and trailing edge signals to said counting means, and means for applying the other of said leading and trailing edge signals to said storing means.

5. The unit of claim 4, further comprising means for applying said trailing edge signal to said counting means to reset the count in said counting means to a maximum value.

* * * * *